US005410639A

United States Patent [19]

Gruel

[11] Patent Number: 5,410,639

[45] Date of Patent: Apr. 25, 1995

[54] AUTOMATIC INSTALLATION FOR THE COMPOSITION AND THE CONTINUOUS PRINTING OF SMALL TEXTS

[75] Inventor: Henri Gruel, Grenoble, France

[73] Assignee: KIS, Japan

[21] Appl. No.: 836,345

[22] PCT Filed: Aug. 6, 1991

[86] PCT No.: PCT/FR91/00650

§ 371 Date: Mar. 3, 1992

§ 102(e) Date: Mar. 3, 1992

[87] PCT Pub. No.: WO92/02909

PCT Pub. Date: Feb. 20, 1992

[30] Foreign Application Priority Data

Aug. 7, 1990 [FR] France .............................. 90 10279

[51] Int. Cl.[6] .............................................. G06F 15/00

[52] U.S. Cl. .................................... 395/102; 395/117

[58] Field of Search ............... 395/102, 110, 117, 114, 395/115, 116, 164–166, 152, 112, 146; 400/70; 358/452, 462, 450; 365/115, 116, 122, 113, 114

[56] References Cited

U.S. PATENT DOCUMENTS 4,616,327 10/1986 Rosewarne et al. .

4,745,561 5/1988 Hinosawa et al. .................. 395/110

4,939,670 7/1990 Freiman et al. ..................... 395/110

FOREIGN PATENT DOCUMENTS 0171380 2/1986 European Pat. Off. .

2621153 3/1989 France .

1005827 9/1965 United Kingdom .

2071894 9/1981 United Kingdom .

8300461 2/1983 WIPO .

9071166 6/1990 WIPO .

*Primary Examiner*—Arthur G. Evans

*Attorney, Agent, or Firm*—Parkhurst, Wendel & Rossi

[57] ABSTRACT

An automatic installation for the composition and continuous printing of small texts, including a console having a screen and a control keyboard, and a microcomputer for processing instructions transmitted by the keyboard and for transmitting them partly to the screen and partly to a printer for printing the text composed onto a medium. The microcomputer additionally manages the whole of the installation and the interaction between the latter and the user. The printer is a printer of the graphics type. The composition proper of the text to be printed is managed by a program adapted to this end and loaded into the memory of the microcomputer. The whole of the text to be printed is previously composed by the user with the aid of a program stored in the microcomputer before being printed.

10 Claims, 6 Drawing Sheets

AUTOMATIC INSTALLATION FOR THE COMPOSITION AND THE CONTINUOUS PRINTING OF SMALL TEXTS

BACKGROUND OF THE INVENTION

The invention relates to a novel automatic installation for the composition and the continuous printing of small texts, especially such as visiting cards. It also relates to an installation of the type in question for composition and continuous printing in traditional format, and especially in A4 type format.

Small printing machines have already been available for a long time, making it possible for non-professionals to rapidly print small texts. However, although widely used, these installations require staff and are not as rapid as the consumer would wish.

An automatic installation has been described in the document FR-A-2 576 437 in which the user types in on a keyboard the elements which he wants to see appear on the visiting cards, menus, etc., by showing these elements on a screen. This installation additionally comprises a printer which prints on a medium of paper of relatively heavy weight, stored in the form of a reel, the text composed by the user. A computer manages the operation of the machine and of the printer. However, while constituting significant progress with respect to the known devices, this installation does not make it possible to compose the page layout at leisure and allows only one type of format.

Then in the French patent FR-A-2 621 153 an automatic installation of the same type has been described, incorporating similar elements to the preceding installation, but in which the printer is able to pivot by 90° so as to be able to permit printing of texts according to at least two formats perpendicular to each other. Nevertheless, the page layout remains fixed, so that choice for the user remains very limited.

In addition, no installation is known of the type in question which is able to permit, on demand, the production of texts or parts of texts in A4 format, in a variable series and in a short timeframe.

SUMMARY OF THE INVENTION

The invention aims to diminish all of these different drawbacks. It provides an integrated automatic installation for the composition and the continuous printing of small texts or parts of texts, comprising:

- a console comprising:
  - a screen, intended for displaying the operating instructions and showing the composed text;
  - a control keyboard, intended for transmitting the operating instructions and for composing the text to be printed;
- a microcomputer including an interface able to permit the exchange of data between the screen and keyboard on the one hand, and the microcomputer on the other hand, the microcomputer being intended for processing the instructions transmitted by the keyboard, and for transmitting them partly to the screen and to a printer intended for printing the composed text onto a medium, the microcomputer being additionally intended for managing the whole of the installation and the interaction between the latter and the user.

This installation is characterized:

- in that the printer is a printer of the graphics type, in which printing is managed frame by frame by the microcomputer, in the memory of which are previously stored, in digital form, one or more character fonts, each printed character corresponding to a plurality of frames, in each of which a defined sequence of pixels, stored in the form of digital signals, permits the final restoration of the character in question,
- in that the composition proper of the text to be printed is managed by a program adapted to this end and loaded into the memory of the microcomputer,
- and in that the whole of the text to be printed is previously composed by the user with the aid of the program, then is downloaded into a buffer memory associated with the microcomputer which is able to manage the printing of this text by downloading into the memory of the printer, in step with the printing, the digital signals corresponding to each successive frame of the printer, representing the set of pixels to be reproduced on the medium.

Put another way, the invention consists in providing a means able to show the composition of the text to be produced which, as a function of character fonts stored in digital form in memory, manages the total space of the document, so that any type of printing can be obtained according to several possible formats, and this in both directions, i.e. transversely as well as longitudinally on the medium.

The production of character fonts in digital form is carried out by scanning of each of the fonts at actual size, resulting in a digitized image of each of the characters, then by reduction of the format by conversion, possibly completed by individual manual finishing for each of the characters.

According to one advantageous embodiment of the invention, the installation comprises a payment member constituted by an electronic coin box, able to identify the coins and to transmit this information to the microcomputer via the interface, which then subtracts the sums actually inserted.

According to another form of embodiment of the invention, the installation comprises a steerable camera, able to photograph an individual, typically the user, then to transmit the image obtained to a digitizing card connected to the microcomputer, transmitting the information to the printer, so as thereby to produce texts with portraits.

According to another characteristic of the invention, the printer of the installation comprises lateral gripping members for the paper medium, constituted by guides thus permitting use of great varieties of media, i.e. media of variable width.

The graphics-type printer of the invention has a quality of between ten and fifteen points per millimeter.

The graphics printer prints thermally, on a continuous web unrolled from a reel, a paper medium also in the form of a reel, the reel being sectioned to required dimensions and comprising a preprinted background complete with characters of different colors and/or a logo.

The installation additionally comprises a scanner intended:

- for analyzing the surface of a sheet incorporating predetermined patterns introduced by the operator;
- for digitizing this analysis and transmitting the digital information to the microcomputer via the interface, so that the latter gives the order to the printer to print it at a site which has been previously selected by the operator, or previously selected in the microcomputer.

According to one advantageous form of this installation, the selection of the place of printing of the pattern or of the logo is carried out by means of an XY control plane. Moreover, the size of the pattern or of the logo to be printed is adjusted by means of a potentiometer or a linear cursor constituting an enlargement-reduction control associated with the console.

The manner in which the invention can be produced and the advantages which flow from it will better appear from the example of embodiment which follows, given by way of a non-limiting example in support of the attached figures.

DETAILED DESCRIPTION OF THE INVENTION

Figure 1:
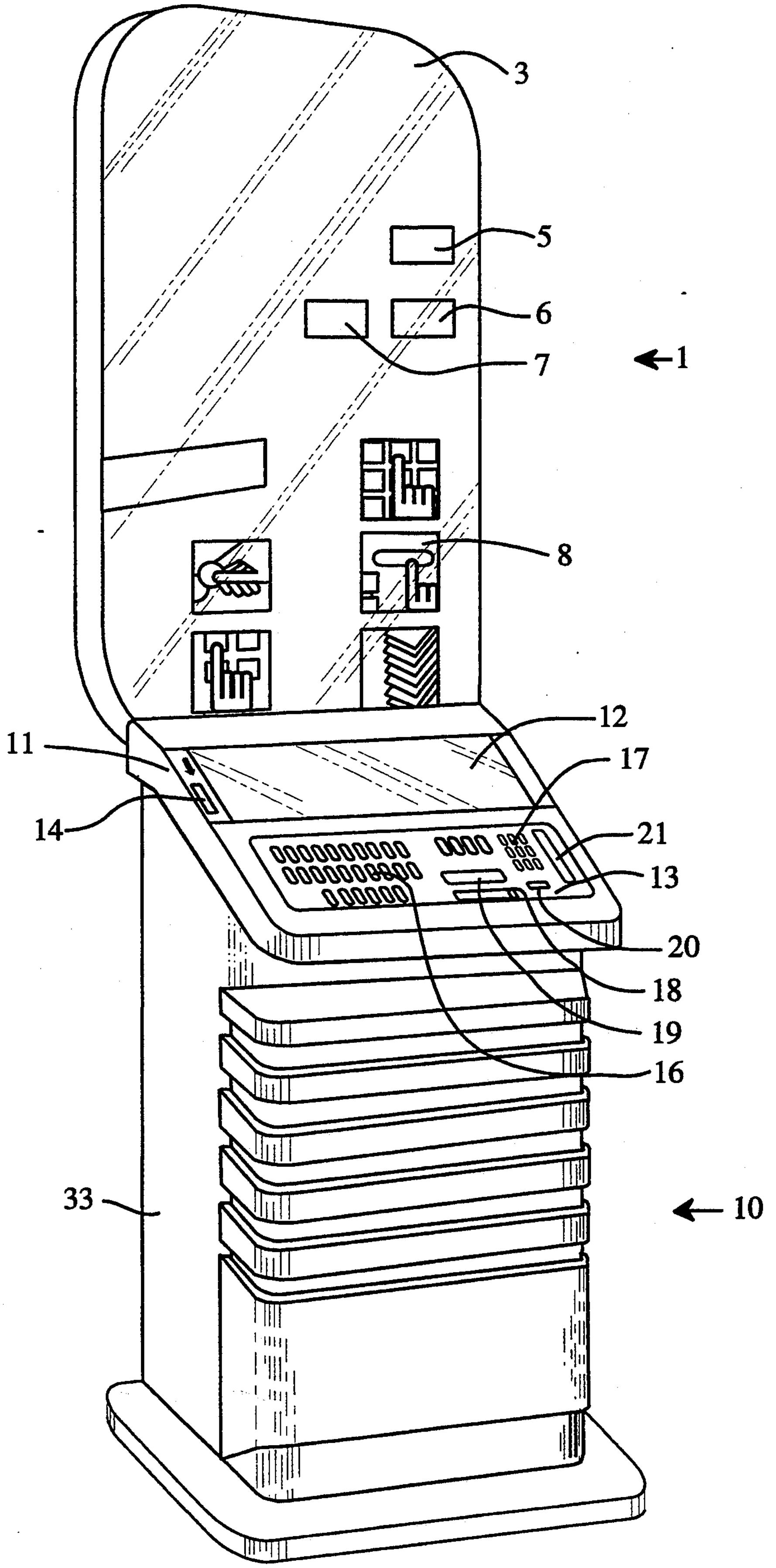
FIG. 1 is a perspective outline view of an installation in accordance with the invention.
Figure 2:
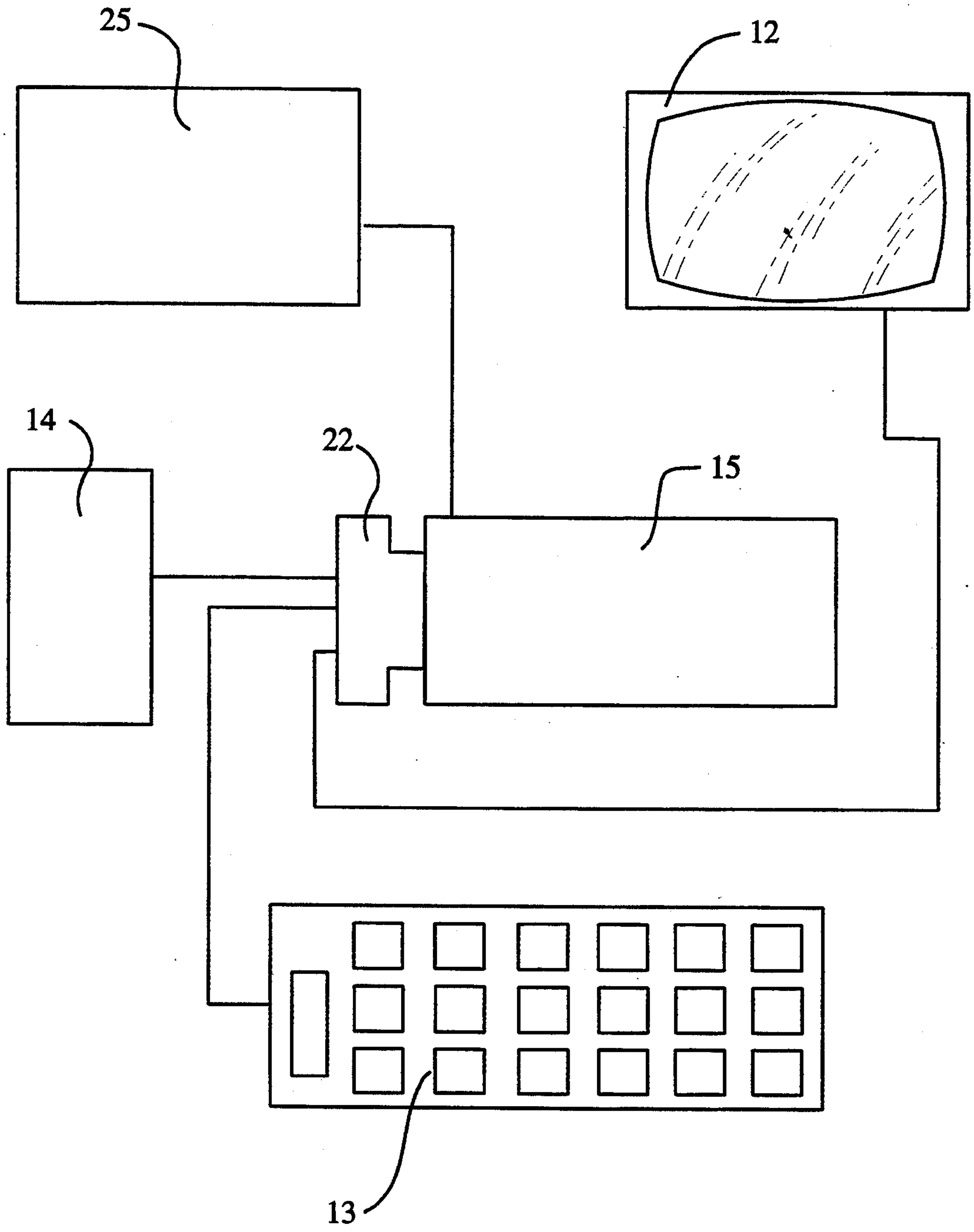
FIG. 2 is a block diagram representation of the console which is characteristic of the invention.

The automatic integrated installation for the composition and the continuous printing of small texts in accordance with the invention and/or parts of texts, comprises on the one hand, a panel designated by the general reference (1), comprising a flap (3) of, for example, concave shape, exhibiting different models (5, 6, 7) of composition, offered for reproduction as well as (8) the essential operating instructions.

The installation also comprises a console designated by the general reference (10), arranged just below the panel. This console, which exhibits on its upper part (11) a screen (12) intended to display the operating instructions and to show the composed text, also comprises a control keyboard (13), intended for transmitting the operating instructions and for composing the text to be printed. Put another way, the keyboard-screen assembly constitutes the interaction member between the user and the installation. The screen (12) is of the black-and-white type, but of high resolution. Nevertheless, a color screen of 640×480 lines can be envisioned.

The keyboard (13) can be produced in any known way. It can, for example, be a capacitive or mechanical keyboard, or advantageously be a keyboard constituted by superimposed plates with a membrane.

The console (10) also comprises a payment member (14) such as an electric coin box of the NRI type with a vertical slot situated in a vertical plane, in order to avoid vandalism and the insertion of foreign bodies other than coins. It can moreover be coupled to a banknote reader of the LANDIS-GYR type. This electronic coin box is intended, in a known way, to detect and identify predetermined coins, transmitting these data to a microcomputer (15), which then subtracts the sums actually inserted and, when the total is correct, engages the operating process.

The keyboard (13) comprises a series of keys respectively:

(16) corresponding to the different letters of the alphabet, namely in upper and in lower case; if necessary, the keyboard can also incorporate other signs, such as accents, diaeresis, etc.;

(17) numbers;

(18) punctuation;

and three control keys (19, 20, 21) respectively for correction (19), spacing (20) and validation (21).

The installation internally comprises the microcomputer (15) already mentioned, linked by an interface (22) respectively to the coin box (14), to the keyboard (13) and to the screen (12).

In an advantageous and known way, the interface (22) is integral with the microcomputer (15). It transmits the signals output by the coinbox (14), by the keyboard (13) and by the screen (12), rendering them compatible with the microcomputer (15). In one embodiment, the assembly can be constituted by a specific electronic card.

Figure 3:
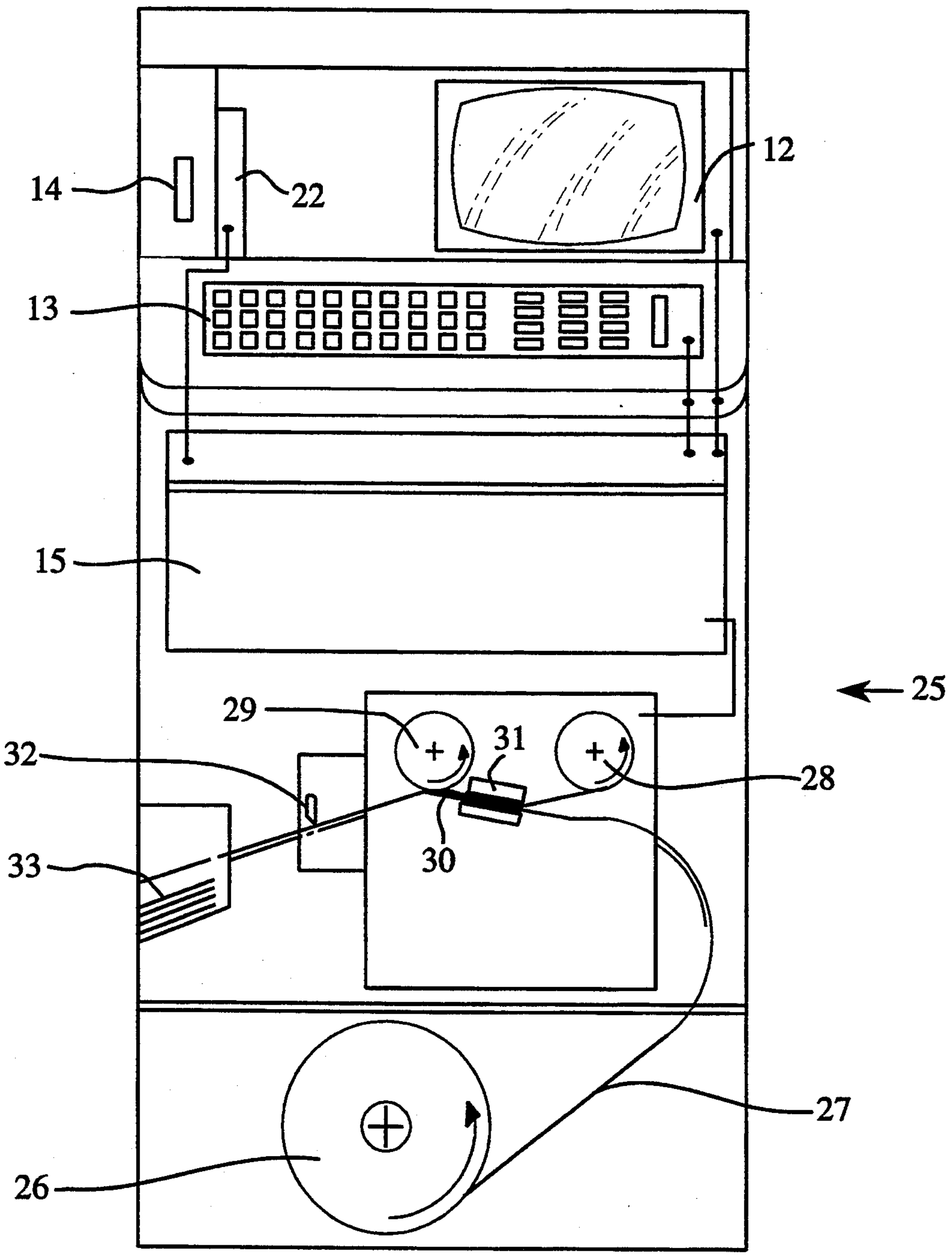
FIG. 3 is a more detailed diagrammatic representation of this console.

The microcomputer (15) of the compatible type exhibits a rapid cycle time with a memory of at least a megabyte as well as an integral diskette reader, which is not shown. This diskette reader is intended to receive a diskette containing a program, which is loaded when power is applied. This microcomputer (15) is linked to a thermal printer (25), of the type known per se, especially for printing characters, in graphics mode. Advantageously, a printer marketed by TEC under type number B 402 is used, having a definition of 10 points per millimeter, and a method of printing by thermal transfer. This printer designated by the general reference (25), is fundamentally constituted by a reel (26) for supply of a web of paper of specific weight and in a continuous form (27) (FIG. 3). It also comprises an apparatus for thermal film, respectively a reel for supply (28) and for reception (29) of the thermal film (30). The print head (31) constituted by a row of needles, comes into contact with the web (27) and by selection and heating of the appropriate needles, induces the deposit of ink onto the paper, frame by frame. The continuous movement of the paper medium (27) and of the film (30) at the level of the print head (31) permits production of the text to be printed. The production of a character requires a plurality of printing frames. A cutting member (32) divides the texts at the desired length. These cut texts are received in a receptacle (33). By appropriate adjustment, especially by means of a roller reel, multiple lengths of cut of the web (27) can be obtained, for example five centimeters for a visiting card, ten centimeters for menus, etc.

Moreover, the printer incorporates lateral gripping members for the web (27) of paper which are fitted with sliders, making it possible to use webs of different widths, and bringing about the automatic centering of the web with respect to the center of the print head (31) of the printer.

Figure 4:
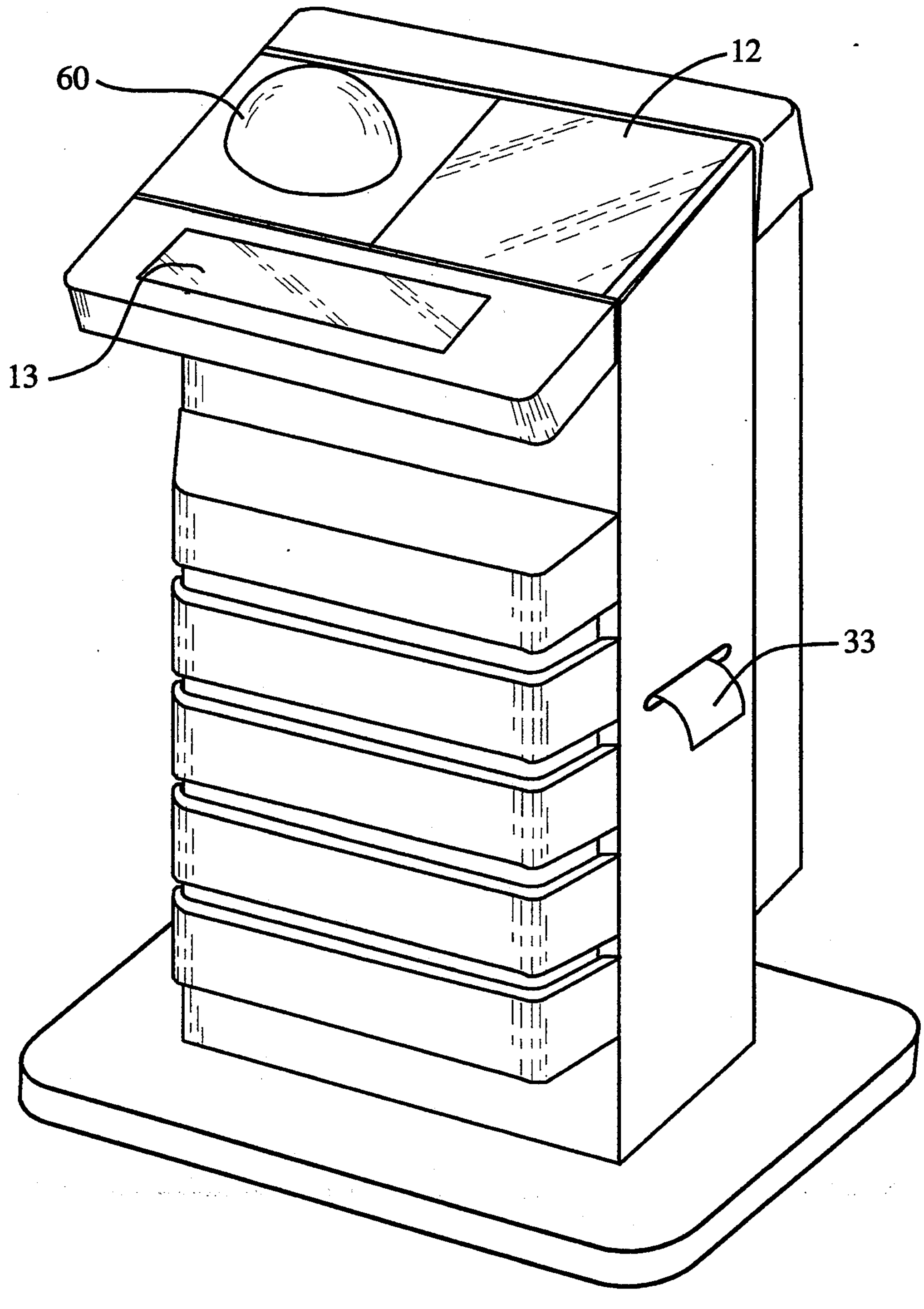
FIG. 4 is a diagrammatic outline perspective representation of another embodiment of the invention.

In one variant of the invention represented in FIG. 4, the console (10) receives a camera (60) which is steerable in a hemisphere, intended for photographing the operator. This camera (60) acquires the image of the individual and transmits it to a digitizing card (not shown) associated with the microcomputer (15), which transmits this digitized image in its turn to the printer (25). Thus texts combined with portraits can be produced, and especially personalized visiting cards or entry cards.

Advantageously, the thermal printer (46) is equipped with an economizer of thermal film. This economizer, of the type which is also known, relies on the principle of disengagement of the said printer if a specific length of thermal film is not demanded from the latter. In fact, the printer restarts during the following demand in order to resume printing. Thus, it is then possible to print a text on any part of the sheet, especially as a heading or on the contrary at the foot of a page, without requiring the unrolling of the thermal film for all of the center of the page. In that way, this printer is completely adapted to the context of production of headed stationery, commercial stationery, especially invoices, order forms, etc. In addition, it is sometimes desirable to include information of a commercial nature also at the foot of a sheet, such as the SIREN or SIRET number, the APE code, etc.

Finally, the printer can advantageously be coupled to a folding machine, capable of folding the sheets after printing into two, three or even four folds.

According to one important characteristic of the invention, the different character fonts submitted to the choice of the user are stored in the memory of the microcomputer. The data in numerical form stored by this memory are obtained in the following manner. The process first of all involves selection of a type of characters. The latter are characterized by their size, also known as body, their stress, in other words their greater or lesser contrast and finally their shape. Each of the characters of a single font is then scanned, that is to say is decomposed by scanning by a matrix of photosensitive cells into a certain number of pixels, the sequence of which, representing the character, is itself digitized. After digitizing, these different characters undergo reduction by conversion by means of an image processing program which is known for this application, and next they are then displayed on a screen, able to permit the character to be viewed, that is to say to show it after digitizing. They can then be refined manually; put another way it is possible, on a coarser matrix than the scanning matrix, produced on the screen, to modify the digital signal corresponding to such and such a pixel with a view to perfecting the shape of a character on a coarser scale. This coarser scale in fact corresponds to the printing matrix.

Once this format of each of the characters of a single font has been obtained, each font is stored in the form of bytes in the memory of the microcomputer, this being done under a specific reference.

In that way, when a specified character font is selected by the user, the sequence of characters corresponding to the composed text to be printed is printed by successive scannings by the printer frame by frame on the paper (27) which is moving, that is to say by printing for each frame of the sequence of pixels representing the totality of the graphical points of a line of text for the frame in question. During the printing of one frame, the memory of the printer is loaded with the next frame from the buffer memory of the microcomputer. At the end of a scan, the paper medium as well as the thermal film advances by one step, corresponding to the spacing of the next frame with a view to permitting the production of the totality of the characters, then of the composed text.

Moreover, the composition of the text proper, put another way the distribution onto the medium, is defined by the user and managed by a program adapted for the purpose and loaded into the microcomputer. This composition is loaded in a buffer memory of the microcomputer with which the totality of the different fields is filled. In that way line-by-line management of the printer is made possible, so that a final text which is printed along one or the other of the two perpendicular directions can be obtained, directions corresponding respectively to the direction of movement of the paper, or to a direction which is perpendicular to this direction, taking account of this overall management of the composition.

Figure 6:
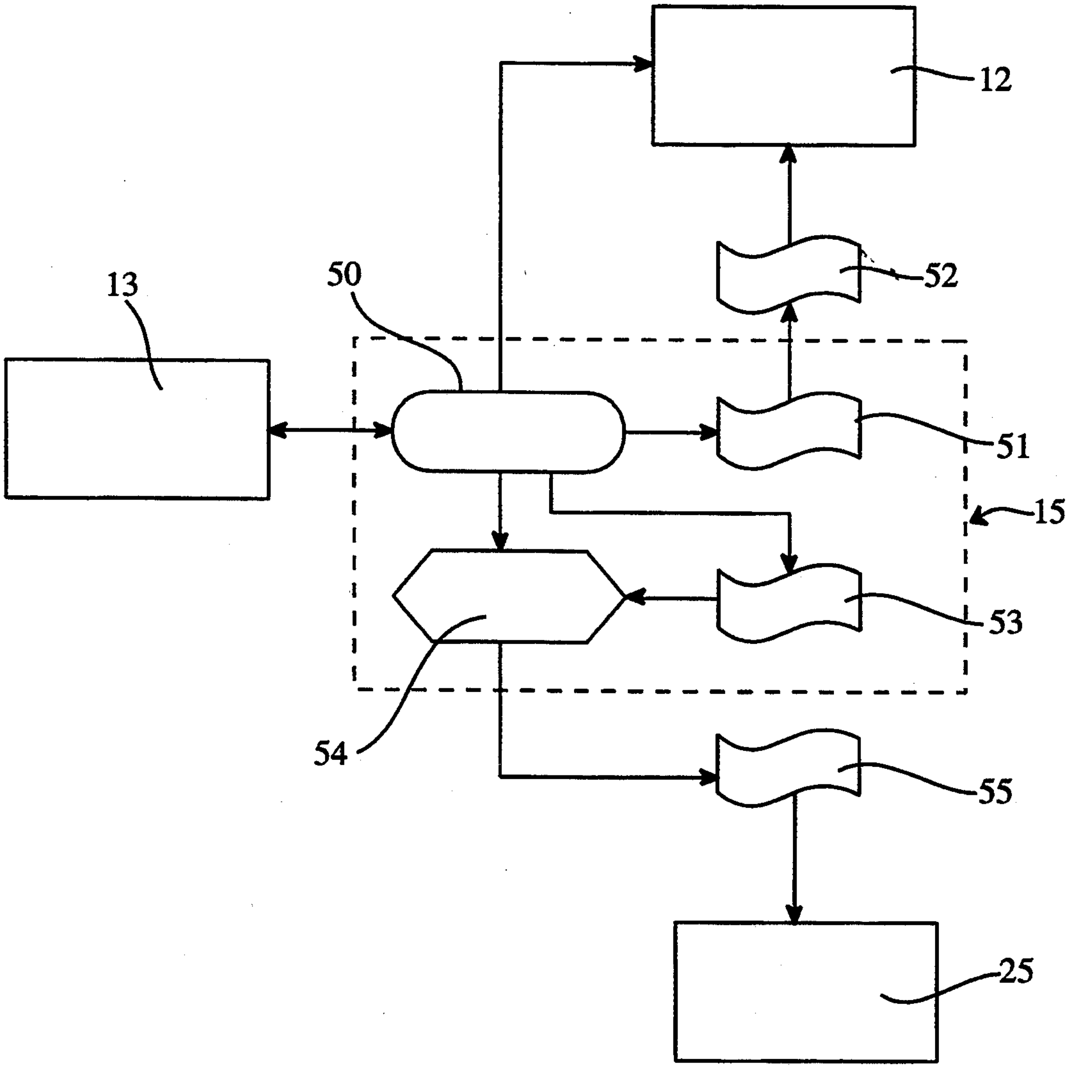
FIG. 6 is an outline block diagram representation of the operation of the installation in accordance with the invention.

In FIG. 6 is represented an outline block diagram of the operation of the printer, in accordance with the invention. As already said, the keyboard (13) makes it possible to establish the interaction between the user and the microcomputer (15). It can especially select the format, the type of characters, and the direction of printing. Moreover, it itself composes the composition of the text, with the aid of a program adapted for the purpose (50), loaded into the memory of the microcomputer (15). This program first of all selects, at the instigation of the user, the character font adopted in the memory (51) on the one hand, with a view to the downloading of this font into the memory (52) of the screen (12), in order to permit showing the text, and possibly going on to make corrections. In the same way, it selects this same font in the memory (53), with a view to downloading this font into the buffer memory (54) of the microcomputer, in which memory the text is composed. The contents of this buffer memory (54) are downloaded frame by frame into the memory (55) of the printer, so that it proceeds with the printing frame by frame, as previously described.

The automatic integrated installation of the invention operates in the following manner. It is initialized by the insertion of coins into the coin box (14) to a total which is determined with respect to the choice by the user. This initialization is indicated by the display on the screen (12) of a message indicating the course to follow. The user first of all has to choose, at the instigation of the messages on the screen, the type of card. Once this choice has been carried out, the user validates it via the "enter" key (21).

He then has to choose the character font which he also validates via the same "enter" key (21).

He then goes on, still at the instigation of the messages on the screen (12), whose sequences are themselves managed by the computer (15), to introducing the text which he wants or his address, telephone number etc. in the case of the production of visiting cards. Each new item of data is validated by the "enter" key (21). When the whole of the text is finished, and when its composition is arranged according to his wishes, verification is requested from the user who, if he accepts the proposed text and the composition indicated on the screen (12), validates it via the "enter" key. In the opposite case, he goes on to make the corrections which he wants by means of the correction key (19) before validation.

According to the type of format chosen, and according to the length of the text envisioned, the first card will appear in the receptacle (33) after a time lapse of between 7 and 60 seconds. Then the following cards will appear at a rate of one every one or two seconds.

Figure 5:
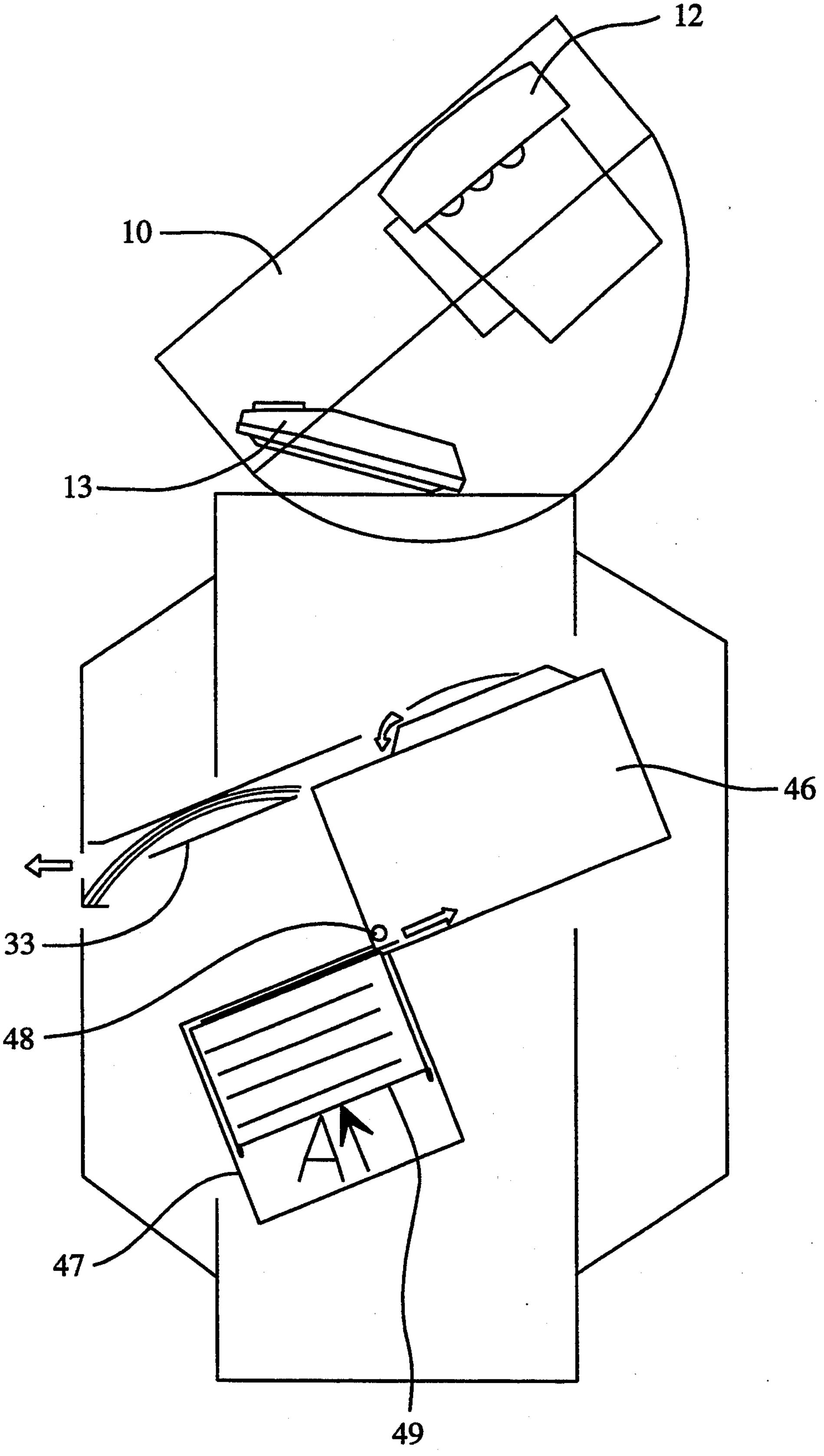
FIG. 5 is an outline sectional view of another embodiment of the invention.

In the embodiment represented within FIG. 5, the printer (46) is equipped in accordance with the invention with a sheet-by-sheet loader (47), in which is placed A4 format paper. This loader (47) is a motorized loader, of the type used in photocopiers, and is equipped at its upper level with a sensitive or cellular detector, associated with a paper takeup roller (48) situated at the level of the lower region of the printer (46). In fact, the driving of the loader brings about the raising of the plate (49) which constitutes the loader, moving then along the arrow A so as to bring the top sheets to the level of the detector. This detector transmits the data concerning the detection of the paper to the printer, itself connected and managed by the microcomputer, in such a way that if the total quantity of paper is insufficient, the operating process of printing cannot start. The operation of this mode of embodiment is similar to that previously described.

The installation according to the invention exhibits numerous advantages which result essentially from the fact that it is constituted by an integrated assembly which is entirely automatic and does not need staff other than staff for maintenance and supply of consumable materials. In addition, the different formats and types of printing obtained by means of the dedicated management of the printer, permit a very large choice to be obtained, very rapidly and at a modest price.

I claim:

1. An integrated automatic installation which interacts with a user to compose and continuously print small texts or parts of texts, said installation comprising:

a console comprising a screen for displaying operating instructions for the installation and showing the composed text, and a control keyboard for transmitting the operating instructions and for composing the text to be printed;

a microcomputer including interface means for permitting exchange of data between the screen and keyboard, and between the microcomputer and the keyboard, said microcomputer including processing means for processing instructions transmitted by the keyboard, and transmitting means for transmitting said instructions partly to the screen and partly to a printer for printing the composed text onto a paper medium, said microcomputer further including managing means for managing the whole of the installation and interaction between the installation and the user;

said printer being a graphics type printer, wherein printing is managed frame by frame by the microcomputer, in the memory of which are previously stored, in digital form, one or more character fonts, each printed character corresponding to a plurality of frames, in each of which a defined sequence of pixels, stored in the form of digital signals, permits the final restoration of the character in question;

wherein (i) the composition proper of the text to be printed is managed by a program adapted to this end and loaded into the memory of the microcomputer, (ii) the whole of the text to be printed is previously composed by the user with the aid of said program, and (iii) the whole of the text is then downloaded into a buffer memory associated with the microcomputer which manages the printing of this text by downloading into the memory of the printer, in step with the printing, the digital signals corresponding to each successive frame to be printed, representing the set of pixels to be reproduced on the paper medium.

2. The installation of claim 1, wherein the production of character fonts in digital form is carried out by scanning each font at actual size, resulting in a digitized image of each of the characters, then by reduction of the characters by conversion, optionally completed by individual manual finishing for each of the characters.

3. The installation of claim 1, further comprising a payment member including an electronic coin box for identifying coins and transmitting this information to the microcomputer via the interface, which payment member then subtracts the sums actually inserted.

4. The installation of claim 1, further comprising a steerable camera for photographing an individual, especially the user, and then transmitting the image obtained to a digitizing card connected to the microcomputer, which in turn transmits the information to the printer, so as thereby to produce texts with portraits.

5. The installation of claim 1, wherein the printer further comprises lateral gripping members for the paper medium, constituted by guides, able in addition to permit the centering of the paper medium with respect to the print head of the printer.

6. The installation of claim 1, wherein the graphics printer has a line quality of between ten and fifteen points per millimeter.

7. The installation of claim 1, wherein the graphics printer prints thermally, on a continuous web unrolled from a reel, and the paper medium is also in the form of a reel which is sectioned to required dimensions and comprises a preprinted background complete with at least one of characters of different colors and a logo.

8. The installation of claim 1, further comprising a scanner for analyzing the surface of a sheet incorporating predetermined patterns introduced by the user and for digitizing this analysis and transmitting the digital information to the microcomputer via the interface, so that the microcomputer gives the order to the printer to print the patterns at a site which has been previously selected by the user, or previously selected in the microcomputer.

9. The installation of claim 8, wherein the selection of the place of printing of the pattern is carried out by means of an XY control plane, and the size of the pattern to be printed is adjusted by means of an enlargement-reduction command associated with the console.

10. The installation of claim 1, wherein the printer, controlled by the microcomputer, further comprises a sheet-by-sheet loader.

* * * * *